Oct. 1, 1957　　　　M. A. ZWAAF　　　　2,807,977
EGG CANDLER

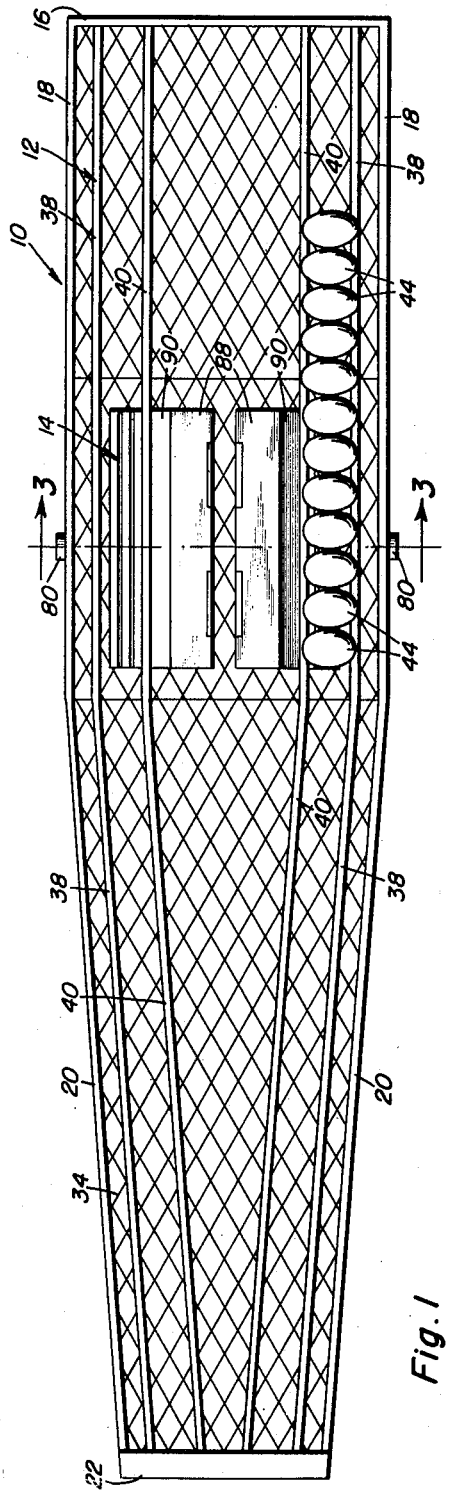
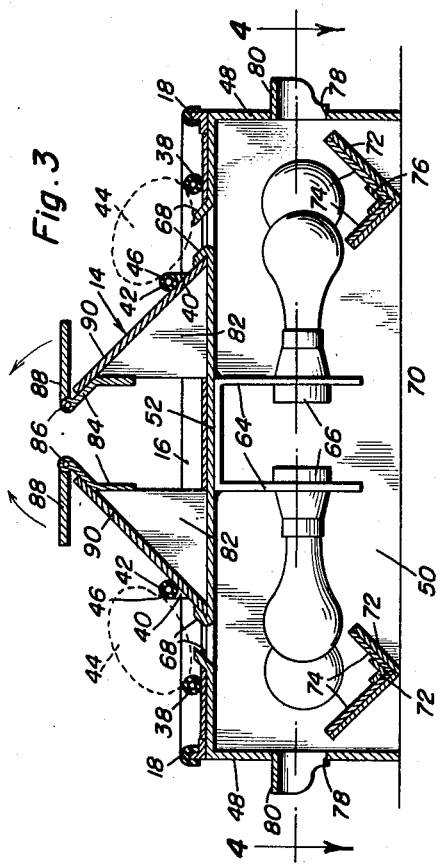
Mortimer A. Zwaaf
INVENTOR.

Filed April 18, 1955　　　　　　　　　　2 Sheets-Sheet 2

Mortimer A. Zwaaf
INVENTOR.

BY Clarence A. O'Brien
and Harvey B. Jacobson
Attorneys

United States Patent Office 2,807,977
Patented Oct. 1, 1957

2,807,977
EGG CANDLER
Mortimer A. Zwaaf, Hopewell, N. J.
Application April 18, 1955, Serial No. 501,960
1 Claim. (Cl. 88—14.5)

This invention relates generally to apparatus for visually testing the character of eggs being graded, and is more specifically directed to an egg candling device which includes means for readily feeding a plurality of eggs successively over a concentrated light, said eggs being positioned at an optimum angle relative to said light whereby the eggs may be graded and checked rapidly, economically and thoroughly.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top elevational view of the novel egg candling device;

Figure 3 is an enlarged sectional view taken substantially on line 3—3 of Figure 1.

The egg candling device is indicated generally at 10 and includes a support platform 12 and a light box 14.

Figure 2:
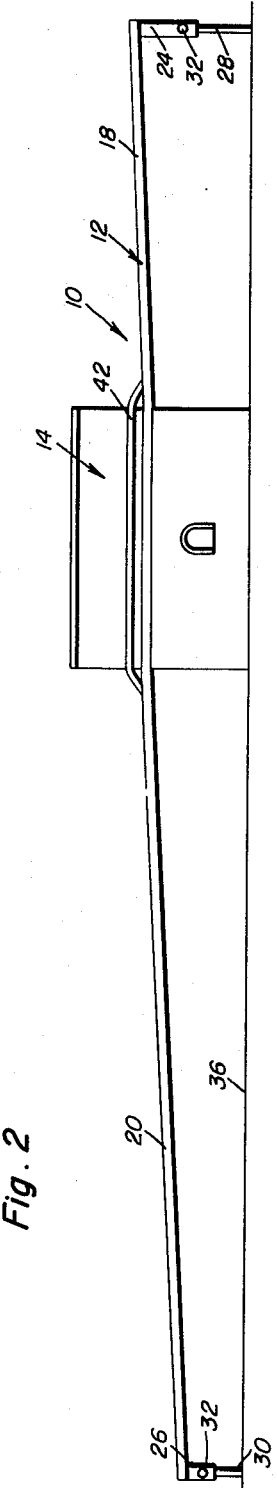
Figure 2 is a side elevational view.

The platform 12 includes an end frame member 16 connected to longitudinally extending side members 18 terminating in diverging side member portions 20 which are suitably connected to an end member 22 which constitutes a bumper and which may be made of foam rubber or any other suitable shock-absorbing material. Connected at each of the corners of the platform 12 where the end members 16 intersect the side members 18, and where the side members 20 intersect the end member 22 are support legs 23 and 26, respectively, each including telescoping ends 28 and 30, respectively, which are vertically adjustable through the medium of suitable transverse adjusting screws 32. The platform 12 includes within the end and side members an open screen portion 34 which permits the passage therethrough of eggs broken accidentally during the candling operation. A suitable plastic sheet, etc., may be placed on the surface 36 beneath the candling device, and thus the broken eggs and shells may be caught thereon and removed after the candling operation has been completed. It will be noted that the legs 24 are of a greater height than legs 26 and accordingly legs placed on the platform 12 will roll from the high end toward the lower end due to the force of gravity. Furthermore, the legs may be adjusted in order to control the speed an egg will freely roll from the high end toward the low end. Suitably secured to the wire platform 34 are rubber track elements 38 and 40, each of which is comprised of a wire covered with a soft resilient rubber, said track members being suitably spaced in relative parallel relation to each other and the side members 18 and 20, the innermost member 40 being raised as seen at 42 in Figures 2 and 3 whereupon an egg will be raised to approximately a 45° angle relative to its longitudinal or longest axis when in a position over a light box 14, see for example the egg shown in dotted lines at 44 in Figure 3. Inasmuch as this device is used in a semi-dark room one of the track members may be of a white rubber in order to be more readily seen by the operators of the device, and one may include a ribbed peripheral surface 46, see for example, track member 40 of Figure 3. The ribbed surface will tend to improve the frictional qualities of the track in order to retain the eggs rolling from the high end 16 down toward end 22 with the eggs rolling from the high end 16 down toward end 22 with their longitudinal axis perpendicular to said track. Thus without considering the light box 14, it is believed readily obvious that an assistant places eggs at the end 16 whereupon they roll toward the light box 14 and a person proficient at candling eggs observes them passing over the light box 14 and then the eggs are permitted to roll down the track toward the end 22. Those eggs which are found to be cracked, imperfect, etc., may be removed and the progress of candling the eggs will not be impeded.

Although there has been disclosed herein a candling device which encompasses a "double machine," it is believed readily apparent that the candling apparatus as viewed in Figure 1 could be divided down the longitudinal center thereof and only one side need be utilized.

The lighting box 14 is substantially rectangular fitting between the side frame members 18 and including sides 48 connected to ends 50 and including a top 52 with the end members 50 having secured thereto suitable side members 54 which enclose wiring, not shown, and have mounted thereon suitable switches 56 and 58. Secured on the side walls 50 are conventional light sockets 60 and extending downwardly from the top member 52 is a U-shaped bracket 62 having side legs 64 upon which are secured conventional light bulb sockets 66. The bulbs as indicated are 100 watt, 60 watt, and are indicated as being General Electric White, however, any arrangement of the wattage may be incorporated in order to get the proper concentration of light for performing the candling operation. The plural switches are provided inasmuch as less light is required for white eggs than is required for brown eggs, and accordingly, the lights may be connected to the switches in any suitable manner in order to provide a lesser amount of illumination for white eggs than for the brown.

Figure 4:
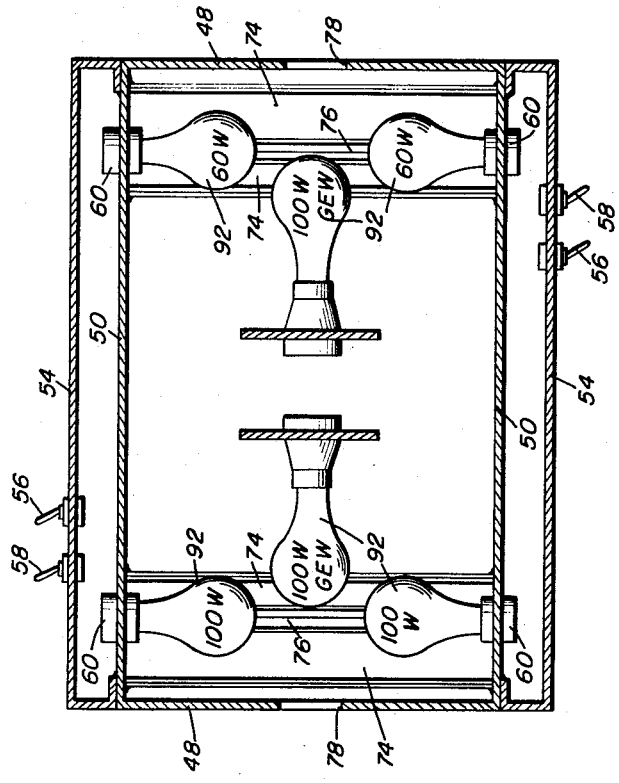
Figure 4 is a sectional view taken substantially on line 4—4 of Figure 3.

It will be noted that the top 52 includes a pair of upturned flanges 68 which define a longitudinal slot beneath the track elements 38 and 40, and as most clearly seen in Figure 3 light projected through this slot will be concentrated in the approximate middle of the egg whereby it may be examined by the person performing the candling operation. Suitably secured to the bottom 70 of the light box between the end walls 50 are right angled brackets 72 which have secured on the legs thereof deflecting mirrors 74 contained in position by bracket strips 76. The side walls 48 include centrally located checker apertures 78 which are covered by a suitably secured hooded portion 80 which prevents upward reflection of light in the operator's eyes. It is believed fairly obvious from Figures 3 and 4 that the reflecting mirrors 74 will reflect light upwardly through the longitudinal slots formed by flanges 68 for checking eggs as they roll from end 16 toward 22 on the track members 38 and 40, and the mirrors 74 located inwardly will reflect light outwardly through the checking apertures 78 for checking an egg retained therein by an operator.

Suitable angle brackets 82 are secured on top 52 of the light box having supported at their top portions angled support pieces 84 having an upper hinge portion 86 supporting horizontal light deflecting panels 88 which may be pivoted upwardly as indicated by the direction arrows, said deflecting portions preventing excessive reflection of light toward the opposite sides of the candling apparatus, the support bracket 84 having resting thereon an elongated mirror 90 for aiding in the deflection of light upon the egg to aid in candling the same by deflecting light rays escaping from under the eggs and passing over the mirror 90 back to the mirror to be deflected thereby back to the eggs.

It will be noted that the light bulbs identified generally at 92 are located almost directly above the reflecting mirrors 74 for the purpose of attaining the most efficient reflective qualities thereof.

It is accordingly believed that there has been disclosed herein an egg candling aparatus which fully conforms with the objects of this invention heretofore set forth.

Various positional directional terms such as "front," "rear," "top," etc., are utilized herein to have only a relative connotation to aid in describing the device and are not intended to be interpreted as requiring any particular orientation thereof with respect to any external elements.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

Egg candling apparatus comprising an enclosed light box adapted to be placed in elevated position and having a top provided with an elongated slot, a pair of tracks extending over said top and spaced inwardly of one side of the box and at opposite sides of the slot for supporting eggs disposed lengthwise across the tracks, said tracks being inclined longitudinally to cause eggs thereon to roll over and along said slot, a light source in said box for directing light rays upwardly through said slot against eggs rolling over the slot, a flat reflector plate rising from said top at a side of the tracks remote from said side of the box and inclining upwardly away from said tracks, a pair of flanges on said top inclining upwardly from opposite sides of the slot beneath the eggs over the slot and toward said reflector plate to direct the upwardly directed light rays against the eggs over the slot and toward the reflector plate, and a deflector plate extending horizontally along the top edge of the reflector plate in overlying relation thereto to deflect light rays back to said reflector plate to be reflected by the reflector plate back towards the eggs over said slot, one of said tracks having a raised straight portion at said remote side of the tracks for tilting the eggs longitudinally upwardly at said remote side to facilitate sighting through the eggs by a person seated at said side of the box.

References Cited in the file of this patent

UNITED STATES PATENTS

| | | |
|---|---|---|
| 843,622 | McTaggert | Feb. 12, 1907 |
| 1,135,101 | Eberle | Apr. 13, 1915 |
| 1,360,987 | Moll | Nov. 30, 1920 |
| 1,816,483 | Heaton | July 28, 1931 |
| 1,875,811 | Hilgers | Sept. 6, 1932 |
| 2,093,338 | Niederer | Sept. 14, 1937 |
| 2,130,437 | Taylor | Sept. 20, 1938 |

FOREIGN PATENTS

| | | |
|---|---|---|
| 7,450 | Great Britain | of 1902 |
| 424,819 | France | Mar. 22, 1911 |
| 252,991 | Great Britain | June 10, 1926 |